United States Patent
Hayashi

(10) Patent No.: US 6,684,574 B2
(45) Date of Patent: Feb. 3, 2004

(54) INSERT FOR TRIM, TRIM AND WEATHER STRIP FOR VEHICLE

(75) Inventor: Keizo Hayashi, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 82 days.

(21) Appl. No.: 09/984,287

(22) Filed: Oct. 29, 2001

(65) Prior Publication Data

US 2002/0050101 A1 May 2, 2002

(30) Foreign Application Priority Data

Oct. 31, 2000 (JP) ..................................... P.2000-332857

(51) Int. Cl.[7] ............................................... B60J 10/00
(52) U.S. Cl. .................................. 049/490.1; 049/498.1
(58) Field of Search ............................. 49/475.1, 490.1, 49/498.1; 428/134, 180, 182

(56) References Cited

U.S. PATENT DOCUMENTS

| | | | | |
|---|---|---|---|---|
| 3,310,928 A | * | 3/1967 | Weimar | 52/716.8 |
| 3,706,628 A | * | 12/1972 | Azzola | 428/122 |
| 3,993,819 A | * | 11/1976 | Fewkes | 428/136 |
| 4,188,424 A | | 2/1980 | Ohno et al. | |
| 4,196,546 A | * | 4/1980 | Bright | 49/490.1 |
| 4,214,036 A | * | 7/1980 | Bright | 428/358 |
| 4,304,816 A | * | 12/1981 | Bright et al. | 428/358 |
| 4,333,221 A | | 6/1982 | Hayashi | |
| 4,355,448 A | | 10/1982 | Ezaki | |
| 4,523,448 A | | 6/1985 | Sakai et al. | |
| 4,610,907 A | * | 9/1986 | Elvira | 428/122 |
| 5,305,552 A | * | 4/1994 | Guillon | 49/490.1 |
| 5,343,669 A | * | 9/1994 | Petri | 52/716.8 |
| 5,783,312 A | * | 7/1998 | Laughman et al. | 428/573 |
| 6,435,597 B1 | * | 8/2002 | Anders et al. | 296/107.07 |

FOREIGN PATENT DOCUMENTS

JP  53-136225  11/1978

* cited by examiner

Primary Examiner—Gregory J. Strimbu
(74) Attorney, Agent, or Firm—Posz & Bethards, PLC

(57) ABSTRACT

A U-shaped insert for a weather strip includes a plurality of segments, which are spaced apart by a predetermined interval. Adjacent pairs of the segments are attached together by a pair of coupling members. The coupling members of each pair of the segments are substantially parallel to one another. Acutely angled corners are formed by each coupling member and the segments to which it is attached. The acutely angled corners include notches, which are cylindrical and extend into the associated segment. This permits deformation of the insert, while the insert resists tensile deformation.

20 Claims, 5 Drawing Sheets

INSERT FOR TRIM, TRIM AND WEATHER STRIP FOR VEHICLE

BACKGROUND OF THE INVENTION

The present invention relates to a weather strip for a vehicle, for example, a trim to be used for the weather strip or a decorative member and an insert for the trim embedded in a body made of polymer material such as rubber, elastomer and resin to retain the shape of the trim. The present application is based on Japanese Patent Application No. 2000-332857, which is incorporated herein by reference.

As a trim of this kind, there has been known a structure in which an insert formed of a metal plate for retaining the shape of a trim body made of polymer material such as rubber, elastomer and resin and maintaining the gripping force of gripping lips to grip a flange portion of a vehicle body is embedded in the trim body. The trim body is bent to have a substantially U-shaped cross-section and the gripping lips for gripping the flange portion around an opening of the vehicle are protruded from the internal surface of the trim body. A weather strip has the trim body attached to the flange portion around the opening of the vehicle body, and a hollow sealing portion being protruded from the outer surface of the trim body, for example, the outer surface of a side portion outwardly and serving to seal the inside and outside of the vehicle cabin.

As such an insert embedded in the trim, for example, there has been known a flat insert having a plurality of rectangular planar segments coupled through one coupling portion in central parts thereof (a first conventional structure). Moreover, there has also been known a flat insert having a plurality of rectangular planar segments coupled through two coupling portions separated from each other at a predetermined interval (a second conventional structure). As shown in FIG. 6A, furthermore, there has also been known an insert 53 in which a bent wire 51 is connected through two longitudinal members 52 in a predetermined position (a third conventional structure). FIG. shows a state in which the insert 53 having the third conventional structure is embedded in polymer material and is bent to have a U-shaped cross-section. Each of the inserts of first and second conventional structure is also bent to have a U-shaped cross-section and is embedded in polymer material.

In addition, for example, Unexamined Japanese Patent Publication Sho. 53-136225 (U.S. Pat. No. 4,196,546) has also disclosed an insert 60 (a fourth conventional structure). In the insert 60, as shown in FIG. 7A, a metal plate 61 has a first series of slits 62 arranged in a central part thereof with a predetermined interval in a longitudinal direction of the metal plate 61 and a pair of second series of slits 64 also arranged in the longitudinal direction with a predetermined interval in the vicinity of both edge portions 63. By press rolling both edge portions 63 of the metal plate 61 through a pair of rollers, as shown in FIG. 7B, there is formed the insert 60 in which segments 65 are separated from each other and are coupled through oblique coupling links 66.

The trim is usually mounted with bending along the curvature of a flange portion of an opening of the vehicle in such a state that it is cut to have a predetermined length. Although the trim including the insert having the first conventional structure can be bent along the curvature of the flange portion, it has poor contracting and extending properties in the longitudinal direction thereof since one coupling portion located at the central part prevents contracting and extending of the insert. For this reason, it is necessary to strictly manage the length of the trim corresponding to the circumference of the flange portion in order not to generate a clearance between the ends of the mounted trim. Moreover, there has been a problem in that a countermeasure cannot be taken against the case in which the circumference of the flange portion is increased due to a set of tolerances.

Moreover, the trim including the insert having the second conventional structure is generally covered with polymer material and at least one of two coupling portions is cut for use. Consequently, as similar to the aforementioned first conventional structure, while the following property for the flange portion is maintained, the contracting property in the longitudinal direction of the trim is poor so that the length of the trim is to be managed strictly. On the other hand, in such a trim, some extending property is maintained in the longitudinal direction and a countermeasure can easily be taken against the case in which the circumference of the flange portion is increased by the set of tolerances.

However, when the trim is particularly mounted on the flange portion in a bending and an extension state in a position corresponding to the corner portion of the body opening, a residual stress is generated in the trim in some cases. If such a residual stress is present, the trim mounted on the flange portion is apt to be contracted and deformed to gradually restore to an original extrusion state (straight state) by the elastic force of the polymer material itself. Consequently, there has been a problem in that the trim is shifted carelessly from the flange portion at a predetermined position in a slip-off direction, resulting in poor appearance.

On the other hand, the trim including the insert 53 having the third conventional structure is controlled to be extended in the longitudinal direction thereof due to the presence of the longitudinal members 52. In the trim, moreover, contraction in the longitudinal direction is permitted by the deflection of the bent wire 51 and the longitudinal members 52. Consequently, the trim is cut to be slightly longer than the circumference of the flange portion and is mounted in a slight contraction state. Thus, the trim can easily be mounted on the flange portion without generating the residual stress and the clearance, and the appearance of the trim can be enhanced.

In the trim including the insert 53 having the third conventional structure, however, there has been a problem in that the structure of the insert 53 is complicated, a great deal of time and labor is required for forming and the manufacturing cost is greatly increased. Moreover, there has been a problem in that the rigidity is liable to be insufficient because the insert 53 is mainly constituted by the bent wire 51.

Further, the trim including the insert 60 having the fourth conventional structure is covered with polymer material. And the insert 60 is made that portions of both edge portions 63 thinned by press rolling which correspond to the second slit 64 are cut for use. Also in such a trim, the coupling links 66 coupling the adjacent segments 65 are inclined in the same direction with respect to the segment 65 when the insert 60 is bent to have a U-shaped cross-section. For this reason, when the trim is contracted in a longitudinal direction, the coupling links 66 are slightly deformed in such a manner that the coupling links 66 tend to be parallel with the segments 65. Consequently, the distance between the adjacent segments 65 is slightly reduced so that the whole trim is contracted.

In the insert 60 having the fourth conventional structure, however, the coupling links 66 are simply formed to be oblique to the segment 65. For this reason, there has been a problem in that the deformation of the coupling links 66 is not stabilized when the trim is contracted in the longitudinal direction thereof, and the contracting property of the trim is easily varied.

SUMMARY OF THE INVENTION

In consideration of the problems of the conventional insert, this invention has been made. The invention has an object to provide an insert for a trim which can easily be formed, can have a high tensile strength substantially with no elongation and can be contracted stably in the longitudinal direction of the trim, the trim and a weather strip with a trim body for a vehicle.

In order to achieve the object, a first aspect of the invention is an insert for a trim formed of a metal plate which is to be embedded in polymer material of the trim and comprises a plurality of segments and a pair of coupling portions mutually coupling two adjacent segments at a predetermined interval, wherein the coupling portions extend obliquely to the associated segments, and a cut-out portion, or notch, is provided in at least one acute corner of the junctions between each coupling portion and the associated segments.

In the insert for a trim according to the first aspect of the invention, the coupling portions connecting the adjacent segments are inclined in the same direction with respect to the segments when the insert is bent to have a U-shaped cross-section. Therefore, when the contraction force acts in the longitudinal direction of the insert, each of coupling portions is slightly deformed in such a manner that the coupling portion tends to be parallel with the segments. The cut-out portion is provided in at least one of the acute corners of the junctions between each coupling portion and the associated segments. Consequently, when the contraction force acts on the insert, each of the coupling portions is deformed by using the cut-out portion as an origin and the deformation of the coupling portion is stabilized. On the other hand, even if tensile force acts in the longitudinal direction of the insert, obtuse corners in the junctions between each coupling portion and the associated segments will resist deformation, and it is possible to prevent deformation in such a manner that the coupling portion tends to be perpendicular to the segments. Consequently, the insert can be contracted with substantially no elongation. Moreover, the insert can maintain a high tensile strength and can easily be formed by punching a flat metal plate, for example.

Further, a second aspect of the invention is the insert for a trim according to the first aspect of the invention, wherein the cut-out portion is provided on the segment at the acute corner and at least a part of an inner peripheral surface thereof is formed continuously with a side of the coupling portion.

In the insert for a trim according to the second aspect of the invention, in addition to the function of the first aspect of the invention, when contraction force acts in the longitudinal direction of the insert, the coupling portion can be more reliably deformed in such a manner that the coupling portion tends to be in parallel with the segment.

Furthermore, a third aspect of the invention is the insert for a trim according to the second aspect of the invention, wherein the cut-out portion is formed such that an inner peripheral surface thereof constitutes a part of a substantially cylindrical surface.

In the insert for a trim according to the third aspect of the invention, in addition to the function of the second aspect of the invention, when the contraction force acts in the longitudinal direction of the insert, a stress does not converge on a part of the inner peripheral surface of the cut-out portion but the coupling portion can be deformed more stably.

Moreover, a fourth aspect of the invention is the insert for a trim according to any of the first to third aspects of the invention, wherein the coupling portions are formed such that inclinations to the segment are alternately inverted through the segment.

In the insert for a trim according to the fourth aspect of the invention, in addition to the function of any of the first to third aspects of the invention, the directions of movement of the adjacent segments with the deformation of the coupling portion are reverse to each other. Consequently, the amount of the deformation of the whole insert can be reduced.

Furthermore, a fifth aspect of the invention is the insert for a trim according to any of the first to fourth aspects of the invention, wherein the coupling portions are connected to the segments in positions where distances from edges of the segments in the transverse direction are different from each other, respectively.

In the insert for a trim according to the fifth aspect of the invention, in addition to the function of any of the first to fourth aspects of the invention, the position of a bending neutral axis in the trim can be controlled by regulating the position of both coupling portions. Consequently, also in the case in which the insert is applied to the weather strip having a large protruded portion such as a seal portion provided in the side portion of the trim, for example, the bending neutral axis can be set to cancel the inclination of the trim which is caused by the balance of the whole weather strip.

Moreover, a sixth aspect of the invention is a trim comprising a trim body formed of polymer material which embeds an insert therein and is bent to have a substantially U-shaped cross-section, wherein the insert is constituted by the insert for a trim according to any of the first to fifth aspects of the invention.

In the trim according to the sixth aspect of the invention, it is possible to easily mount the trim to the flange portion with good appearance without strictly managing the length of the trim itself for the whole circumference of the flange portion for attachment and generating a clearance between both ends in the flange portion.

Furthermore, a seventh aspect of the invention is directed to a weather strip comprising a trim body formed of polymer material which embeds an insert therein and is bent to have a substantially U-shaped cross-section and a seal portion protruded from an outer surface of the trim body, wherein the insert is constituted by the insert for a trim according to any of the first to fifth aspects of the invention.

In the weather strip according to the seventh aspect of the invention, attachment to the flange portion can easily be carried out with good appearance without generating a clearance between both ends. Moreover, in the 15. case in which the seal portion is provided in a side part, the inclination of the trim body can be prevented from being caused by the balance of the whole weather strip.

Features and advantages of the invention will be evident from the following detailed description of the preferred embodiments described in conjunction with the attached drawings.

DETAILED DESCRIPTION OF THE PREFERRED EMBODIMENTS

First Embodiment

A first embodiment in which the invention is embodied in a weather strip comprising a trim to be mounted to a flange portion in an opening of a vehicle body will be described below with reference to FIGS. 1 to 4.

Figure 1:
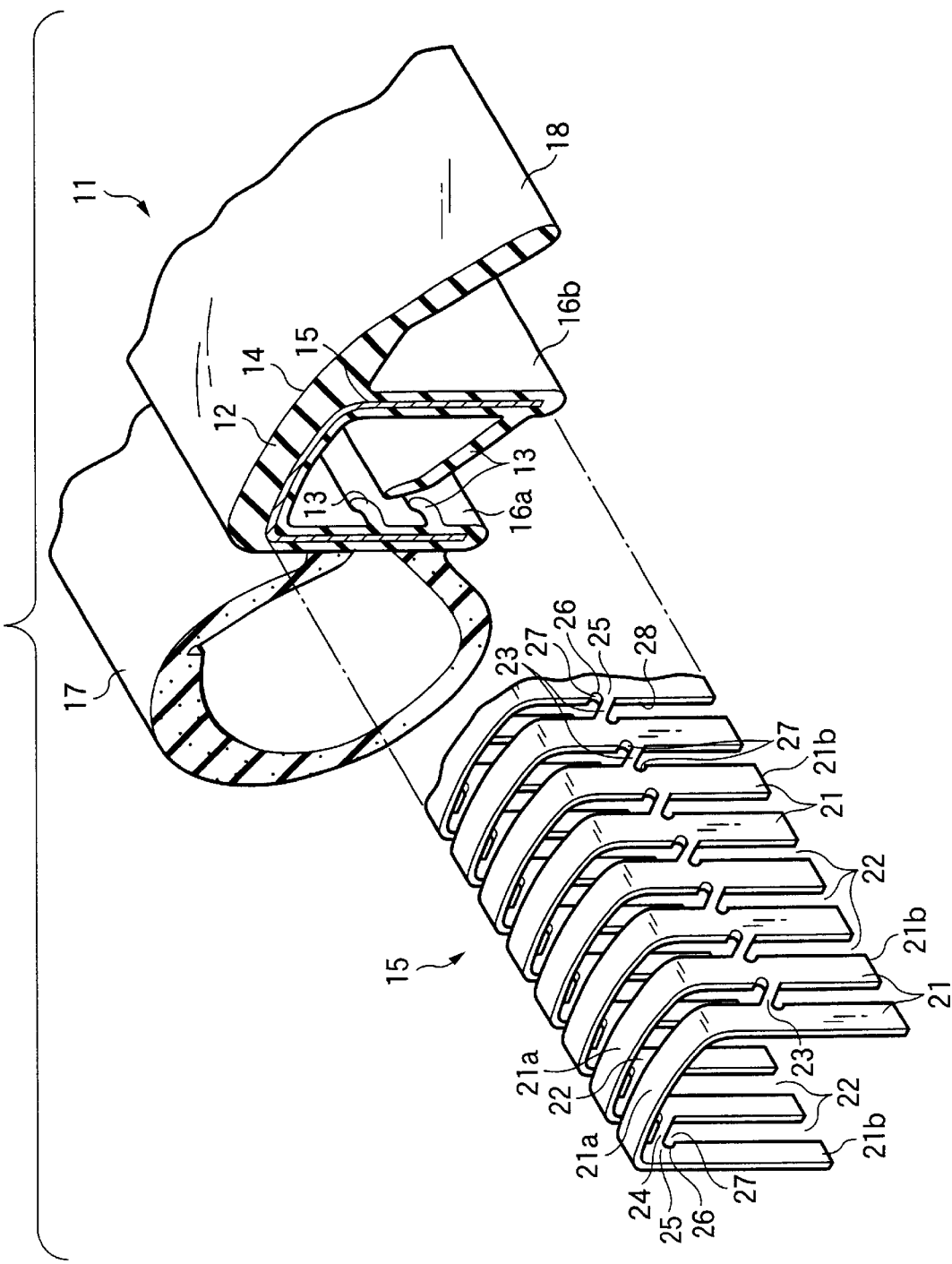
FIG. 1 is a perspective view showing a configuration in which an insert for a trim and a weather strip embedding the insert are extruded according to a first embodiment.
Figure 3:
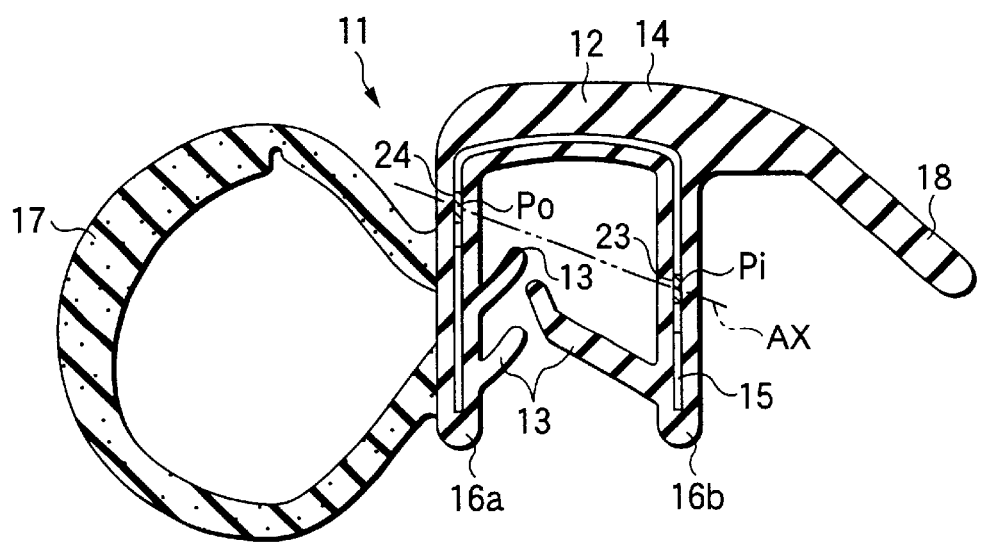
FIG. 3 is a sectional view showing the weather strip in FIG. 1.

As shown in FIGS. 1 and 3, a weather strip 11 comprises a trim 14 including a trim body 12 having a substantially U-shaped cross-section formed of polymer material, for example, EPDM (ethylene-propylene-diene ternary copolymer) solid rubber and at least one flange holding lip 13 protruded from an inside surface thereof. The flange holding lip 13 serves to grip a flange portion (not shown) in the opening of a vehicle body panel and to hold the weather strip 11 on the body panel. An insert 15 formed of a metal plate is embedded in the trim body 12.

A hollow seal portion 17 for elastically abutting on the outer peripheral portion of a door panel (not shown) to seal a portion between the door panel and the body panel is protruded and formed of EPDM sponge rubber on the exterior side of an exterior side wall 16a of the trim body 12. On the other hand, a cover lip 18 for elastically abutting on the interior parts of the vehicle such as a garnish (not shown) is extended from the interior side of a base end in an interior side wall 16b of the trim body 12.

When installing the weather strip 11 on the vehicle body, for example, it is necessary to curve the trim 14 along the curvature of the corner portion of a door opening peripheral portion in the corner portion. For this reason, it is necessary to cause the insert 15 to have a function capable of three-dimensionally curving in a longitudinal direction in a bending configuration having a substantially U-shaped cross-section.

Figure 2:
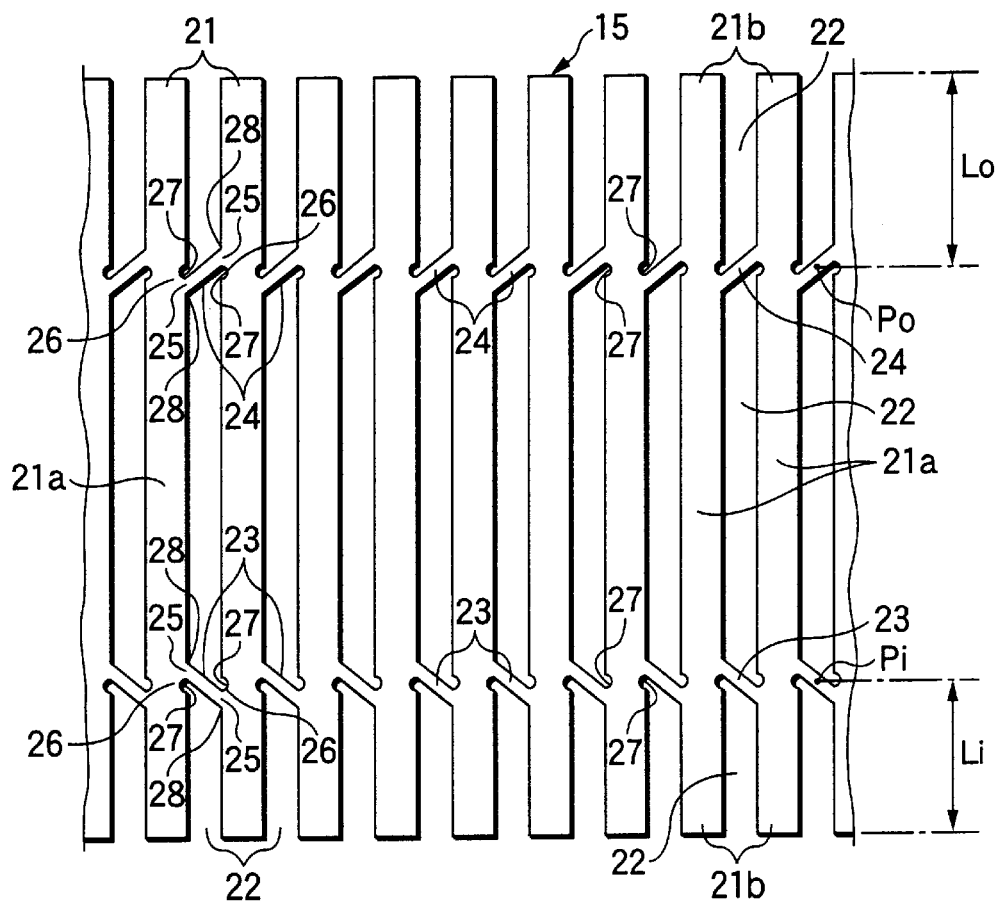
FIG. 2 is a plan view showing the flat state of the insert in FIG. 1.

As shown in FIGS. 1 to 3, the insert 15 is formed of a metal plate having a predetermined thickness and comprises a large number of segments 21, punching holes 22, which are arranged alternately in a longitudinal direction thereof, an interior side coupling portion 23, and an exterior side coupling portion 24, which constitute a pair of coupling portions for mutually coupling the segments 21. In the bending configuration of the weather strip 11, the interior coupling portion 23 is provided on the interior side wall 16b of the trim body 12 and the exterior side coupling portion 24 is provided on the exterior side wall 16a of the trim body 12.

The interior side coupling portion 23 and the exterior side coupling portion 24 are extended obliquely to each segment 21 and are formed such that the coupling members 23, 24 extend in opposite directions to one another with respect to the center of the metal plate, as shown in FIG. 2, and adjacent segments 21 are mutually coupled at predetermined intervals. In other words, as shown in FIG. 2, a central part 21a of the segment 21 and the coupling portions 23 and 24 are formed to define a space with the shape of a substantially isosceles trapezoid, which corresponds to a substantially whole part of the punching hole 22. Consequently, when the insert 15 is bent to have a U-shaped cross-section in such a state that the insert 15 is embedded in the trim body 12, the directions of the inclinations of the coupling portions 23 and 24 are set to be identical to each other.

Moreover, both coupling portions 23 and 24 are connected to each segment 21 in positions where distances from an edge 21b of the segment 21 are different from each other, respectively. More specifically, a distance Lo between a center of gravity Po of the exterior side coupling portion 24 and an extended line of the edge 21b of the segment 21 is set to be greater than a distance Li between a center of gravity Pi of the interior side coupling portion 23 and the extended line of the edge 21b of the segment 21.

Figure 8:
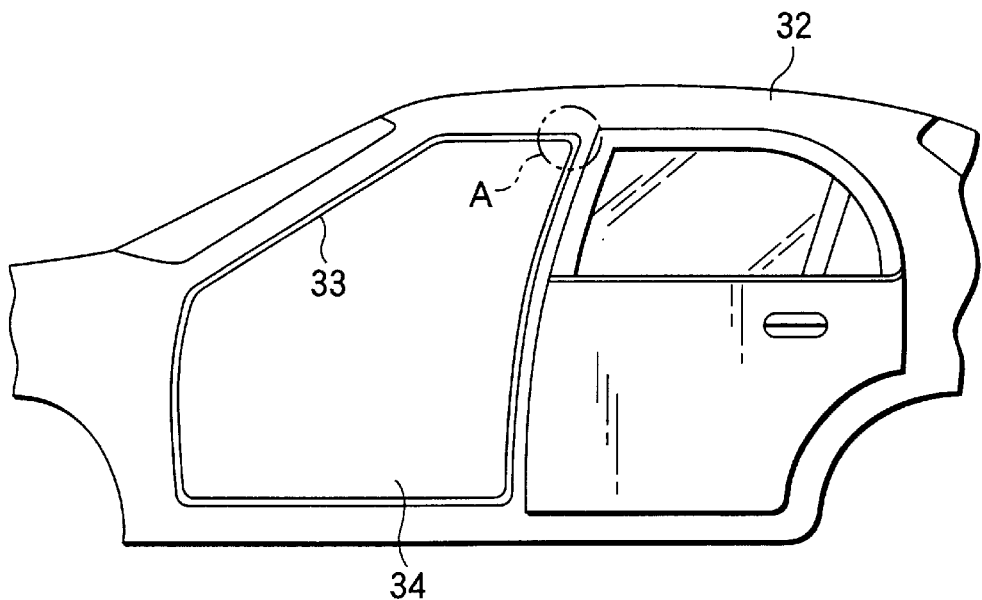
FIG. 8 is a side view of a vehicle body to show an opening and a flange portion.
Figure 9:
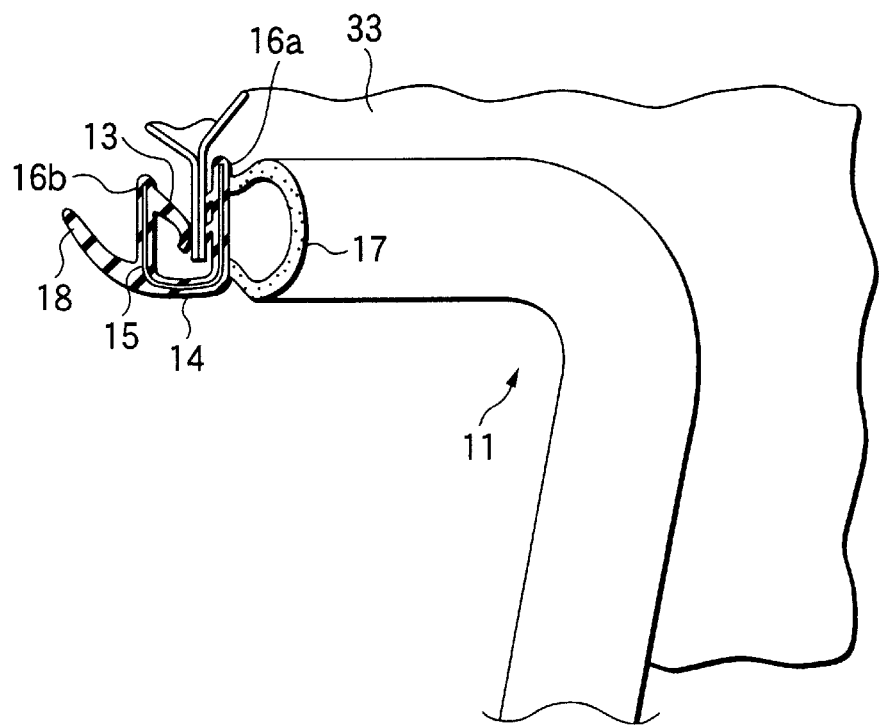
FIG. 9 is an enlarged view of the part A in FIG. 8.

The center of gravity Pi of the interior side coupling portion 23 is set to be substantially in the center of the interior side wall 16b in such a state that the insert 15 is embedded in the trim body 12. On the other hand, the center of gravity Po of the exterior side coupling portion 24 is set to be in the vicinity of the base end of the exterior side wall 16a in such a state that the insert 15 is embedded in the trim body 12. A bending neutral axis AX connecting the centers of gravity of both coupling portions 23 and 24 is inclined. Hereupon, the bending neutral axis AX plays a role of a virtual central axis in a cross section of the trim body 12 when the trim body 12 is bent along a longitudinal direction thereof. As shown in FIG. 8, the weather strip 11 is mounted to a flange portion 33 of an opening 34 of a vehicle body 32. FIG. 9 corresponds to the part A in FIG. 8. As shown in this drawing, when the trim 14 formed in the weather strip 11 is mounted to the flange portion 33, it is curved along the flange portion 33 of the corner portion in the opening 34 of the vehicle body 32. In other words, it is curved along the shape of the corner portion. The weather strip 11 is mounted in such a state that the opening of the trim 14 is directed to the outer circumference of the opening 34 (lower side of FIG. 3) and the bottom of the trim 14 is directed to the inner circumference of the opening 34 (upper side of FIG. 3). At this time, the trim 14 is compressed on the inner side (inner circumference side of the opening 34) of the bending neutral axis AX and is extended on the outer side (outer circumference side of the opening 34) of the bending neutral axis AX, and is neither contracted nor extended on the bending neutral axis AX. For this reason, the trim 14 is liable to be bent around the bending neutral axis AX and the bottom (upper side in FIG. 3) of the trim 14 is liable to be inclined toward the left side in FIG. 3. However, a substantially vertical state is brought during the attachment to the flange portion by a balance generated during the bending deformation of the hollow seal portion 17 on the exterior side. In more detail, a force possibly caused by the aforementioned inclination of the trim 14 is canceled out by a deformation force due to the collapse of the hollow seal portion 17 accompanied with the bending of the hollow seal portion 17, so the trim 14 is substantially held in a vertical state at the time of attaching to the flange portion.

An acute portion 26 in a connecting part 25 with the coupling portions 23 and 24 on the segment 21 is provided with a notch 27 to be a cut-out portion. An acute angle is defined between the coupling portion 23 or 24 and the segment 21. The notch 27 is formed such that an inner peripheral surface thereof is provided continuously on the sides of the coupling portions 23 and 24 and constitutes a part of a short and substantially cylindrical surface in cooperation with the thickness of the insert.

Next, a method of manufacturing the weather strip 11 will be described.

First of all, a metal plate is supplied on a stepping basis to a press to which a punching form for punching the segment 21, the punching hole 22 and both coupling portions 23 and 24 is attached, thereby forming the elongated insert 15.

Subsequently, the elongated insert 15 is supplied to an extruder for extruding the trim 14, the hollow seal portion 17 and the cover lip 18. In the extruder, the trim body 12 and the flange holding lip 13 are extruded of EPDM solid rubber by using the insert 15 as a core member, and at the same time, the hollow seal portion 17 is extruded of EPDM sponge rubber. At this time, the trim 14 is extruded to be substantially plate-shaped by covering the insert 15 having a flat configuration with the EPDM rubber. The weather strip 11 thus extruded is sent in a vulcanization chamber to vulcanize the EPDM rubber, and the trim 14 is then plastically deformed to have a substantially U-shaped cross-section in a bending machine so that the weather strip 11 having a sectional shape shown in FIG. 1 is obtained.

According to the embodiment, therefore, the following effects can be obtained.

Figure 4:
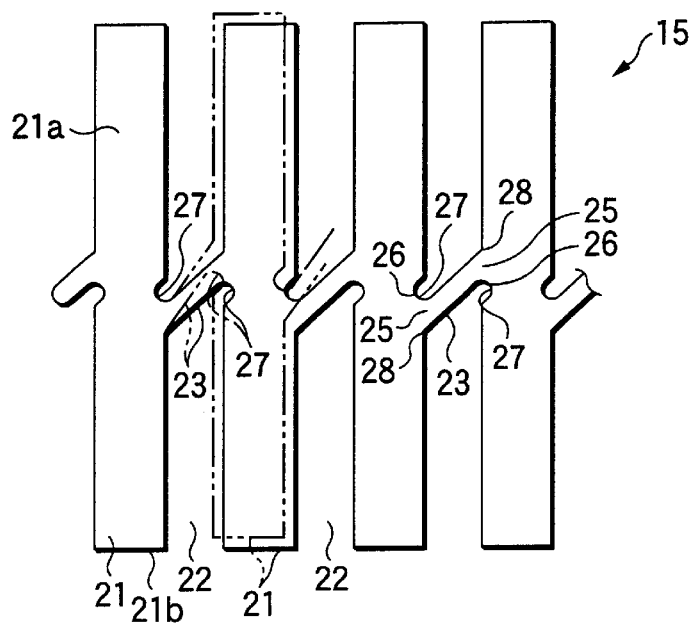
FIG. 4 is a partial plan view showing a state in which the insert of FIG. 1 is deformed.
Figure 5:
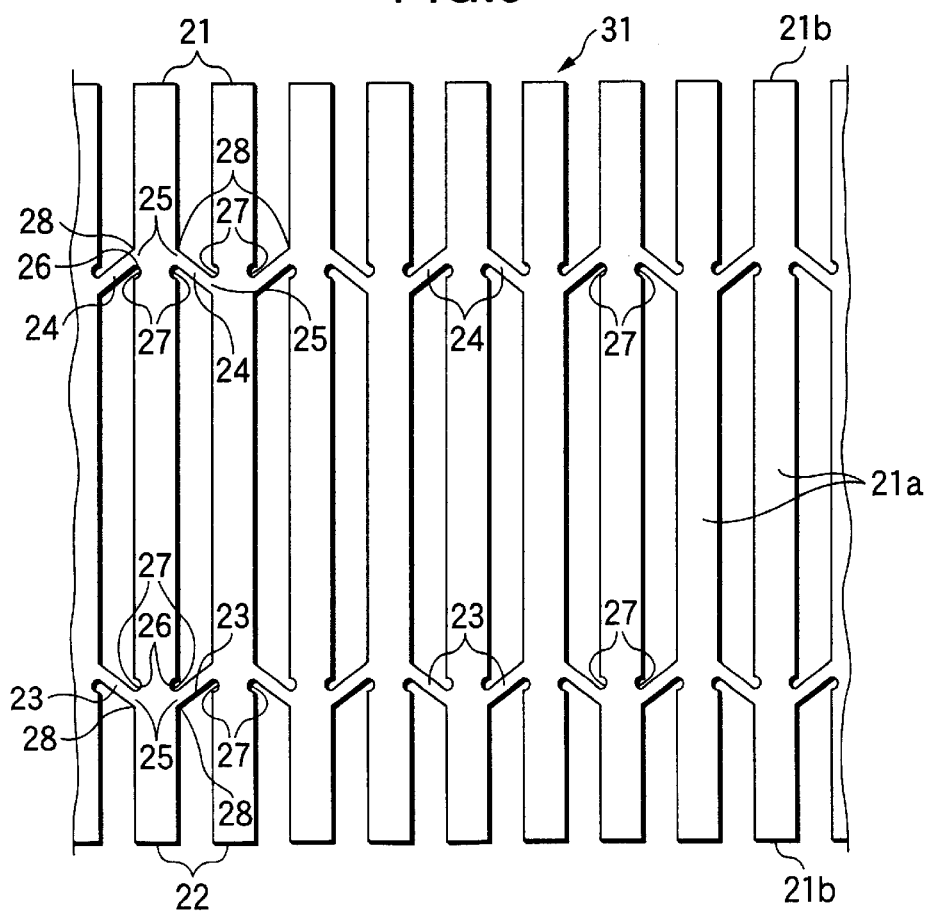
FIG. 5 is a plan view showing the flat state of an insert for a trim according to a second embodiment.
Figure 6A:
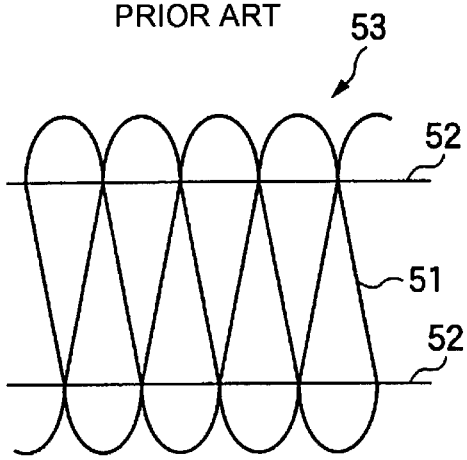
FIG. 6A is a plan view showing the flat state of an insert for a trim having a third conventional structure.
Figure 6B:
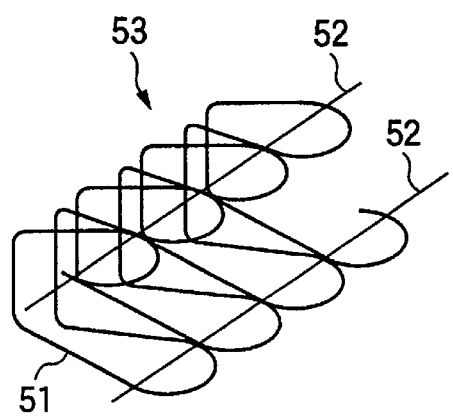
FIG. 6B is a perspective view showing a state in which the insert is bent.
Figure 7A:
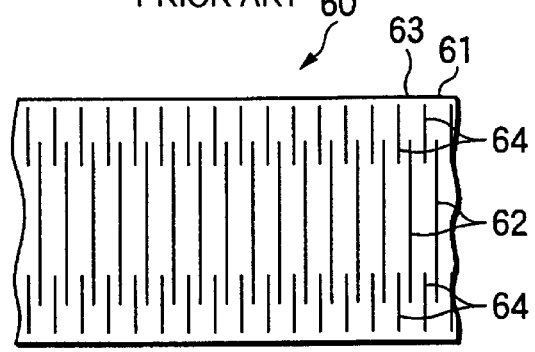
FIG. 7A is a plan view showing a state obtained before an insert for a trim having a fourth conventional structure is press rolled.
Figure 7B:
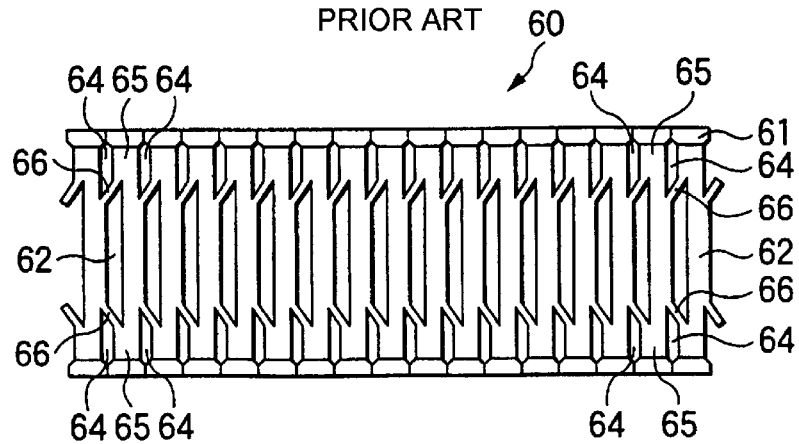
FIG. 7B is a plan view showing a state obtained after the insert is,press rolled.

(1) In the insert 15 of the weather strip 11 according to the embodiment, each of the interior side coupling portion 23 and the exterior side coupling portion 24 is formed to be extended in a flat state obliquely to the segment 21 and the coupling members 23,24 extend in opposite directions to one another with respect to the center of the insert 15, as shown in FIGS. 2 and 5. For this reason, both coupling portions 23 and 24 are inclined in the same direction with respect to the segment 21 when the insert 15 is bent to have a U-shaped cross-section. Consequently, when compression force acts in the longitudinal direction of the insert 15, both coupling portions 23 and 24 are slightly deformed such that they tend to be parallel with the segment 21 as shown in a two-dotted chain line in FIG. 4. In FIG. 4, for simplicity of the description, the amounts of deformation of the coupling portions 23 and 24 and the amount of movement of the segment 21 are exaggerated.

The notch 27 is provided on the acute portion 26 in the connecting part 25 of the coupling portions 23 and 24 in each segment 21. Consequently, when the compression force acts on the insert 15, both coupling portions 23 and 24 are deformed by using the notch 27 as an origin and the deformation of the coupling portions 23 and 24 is stabilized. On the other hand, even if tensile force acts in the longitudinal direction of the insert 15, an obtuse portion 28 in the connecting part 25 of the coupling portions 23 and 24 and each segment 21 resists, thereby preventing the deformation of the coupling portions 23 and 24 from being perpendicular to the segment 21.

Accordingly, the insert 15 can be contracted with substantially no elongation. Moreover, the insert 15 can easily be formed while maintaining a high strength through a work for punching a flat metal plate, for example.

The trim 14 embedding the insert 15 therein can maintain high holding force for the opening flange portion, and can be contracted stably with substantially no elongation in the longitudinal direction thereof. Irrespective of the tolerance of the circumference of the opening flange portion, accordingly, the trim 14 can easily be attached to the opening flange portion without generating a clearance between the ends of the trim 14 in such a state that it is cut to be slightly longer than the circumference and is slightly contracted. Moreover, since the trim 14 is not substantially elongated, a stress for contraction does not remain on the trim 14 attached to the opening flange portion. Consequently, it is possible to prevent the weather strip 11 from being carelessly shifted from the flange portion of the opening edge. Thus, the appearance of the weather strip 11 can be enhanced.

(2) In the insert 15 of the weather strip 11 according to the embodiment, the notch 27 is provided on the segment 21 side of the acute portion 26 in the connecting part 25 of the segment 21 and both coupling portions 23 and 24. The inner peripheral surface of the notch 27 is formed continuously with the side of each of the coupling portions 23 and 24. Consequently, when the contraction force acts in the longitudinal direction of the insert 15, each of the coupling portions 23 and 24 can be deformed in such a direction that the inclination thereof can be more reliably increased by using the notch 27 as an origin.

(3) In the insert 15 of the weather strip 11 according to the embodiment, the inner peripheral surface of the notch 27 is formed to constitute a part of the substantially cylindrical surface. Consequently, when the contraction force acts in the longitudinal direction of the insert 15, stress does not concentrate on a part of the inner peripheral surface of the notch 27 but both coupling portions 23 and 24 can be deformed more stably.

(4) In the insert 15 of the weather strip 11 according to the embodiment, the interior side coupling portion 23 and the exterior side coupling portion 24 are connected to the segment 21 in positions where the distances from the edge 21b of the segment 21 are different from each other, respectively.

By regulating the positions of both coupling portions 23 and 24, consequently, the position of the bending neutral axis AX in the trim 14 can be controlled. Even if a protruded portion such as the hollow seal portion 17 is present in the trim 14, the trim 14 can be attached in a substantially vertical state. In the weather strip 11 according to the embodiment, large protruded portions such as the hollow seal portion 17 and the cover lip 18 are present in the exterior and interior side walls 16a and 16b of the trim 14. When such large protruded portions are present, a stress for causing the bent and protruded portion to return to an original position is generated. By the stress, force to incline the trim 14 with respect to the flange portion of the opening edge is generated. By setting the bending neutral axis AX to cancel the force for inclination, that is, with a reverse inclination to the direction of the inclination, the inclination of the trim 14 can be prevented from being generated. Accordingly, the weather strip 11 can be maintained in a stable attachment state.

Second Embodiment

Next, different portions according to a second embodiment of the invention from the portions according to the first embodiment will be mainly described.

As shown in FIG. 5, in an insert 31 according to the embodiment, an interior side coupling portion 23 and an exterior side coupling portion 24 are formed such that inclinations to each segment 21 are alternately inverted through the segment 21. In other words, a plurality of interior side coupling portions 23 and a plurality of exterior side coupling portions 24 are formed continuously to have a zigzag shape.

According to the second embodiment, therefore, the following effects can be obtained in addition to the effects described in the (1) to (4) in the first embodiment.

(5) The insert 31 of a weather strip 11 according to the embodiment is formed such that the inclinations of both coupling portions 23 and 24 are alternately inverted through each segment 21.

Consequently, the direction of movement of the segment 21 with the deformation of each of the coupling portions 23 and 24 is reverse to that of the adjacent segment 21. Thus, the amount of deformation of the whole insert 31 can be reduced.

(Variant)

The embodiments of the invention may be changed as follows.

While the trim 14 and the hollow seal portion 17 are constituted by the EPDM in each of the embodiments, they may be constituted by rubber other than the EPDM, a soft resin material such as polyvinyl chloride or a thermoplastic elastomer.

While the invention is embodied in the weather strip 11 in which the exterior side wall 16a of the trim 14 is provided with the hollow seal portion 17 and the interior side wall 16b is provided with the cover lip 18 in each of the embodiments, the invention may be embodied in a weather strip which does not have the cover lip 18 or a trim for decoration which does not have the hollow seal portion 17, for example.

While the insert 15 is formed through punching in each of the embodiments, it may be formed by press rolling a metal plate having a slit, for example.

While the notch 27 is provided in the acute portion 26 in the connecting part 25 of each of the coupling portions 23 and 24 and the segment 21 on each side in each of the embodiments, the notch 27 may be provided in only the acute portion 26 on one of the coupling portion 23 and 24 sides.

Each of the coupling portions 23 and 24 in the insert 15 may be changed into a block in plural units to invert the inclination of each of the coupling portions 23 and 24 for each block.

The interior side coupling portion 23 and the exterior side coupling portion 24 in the insert 15 may be connected to each segment 21 in positions where the distances from the edge 21b of each segment 21 are equal to each other.

While the insert 15 is formed of a metal plate in each of the embodiments, examples of the metal plate include various alloy plates such as stainless in addition to an iron plate, an aluminum plate and a copper plate.

As described above in detail, according to the first aspect of the invention, forming can easily be carried out and a high strength can be maintained, and contraction can be performed stably with substantially no elongation in the longitudinal direction of the trim in such a state as to be embedded in the trim.

According to the second aspect of the invention, in addition to the function of the first aspect of the invention, when contraction force acts in the longitudinal direction of the insert, the coupling portion can be more reliably deformed in such a manner that the coupling portion tends to be parallel with the segment.

According to the third aspect of the invention, in addition to the function of the second aspect of the invention, when the contraction force acts in the longitudinal direction of the insert, stress does not concentrate on a part of the inner peripheral surface of the cut-out portion but the coupling portion can be deformed more stably.

According to the fourth aspect of the invention, in addition to the function of any of the first to third aspects of the invention, the amount of the deformation of the whole insert can be reduced.

According to the fifth aspect of the invention, in addition to the function of any of the first to fourth aspects of the invention, also in the case in which the invention is applied to the weather strip having a large protruded portion such as a seal portion provided in the side of the trim, for example, it is possible to prevent the inclination of the trim from being caused by the balance of the whole weather strip.

According to the sixth aspect of the invention, it is possible to implement a trim which can easily be attached to the flange portion with good appearance.

According to the seventh aspect of the invention, it is possible to implement a weather strip which can easily be attached to the flange portion with good appearance. Moreover, it is possible to prevent the inclination of the trim body from being caused by the balance of the whole weather strip.

Although the invention has been described in its preferred form with a certain degree of particularity, it is understood that the present disclosure of the preferred form can be arrangement of parts without departing from the spirit and the scope of the invention as hereinafter claimed.

What is claimed is:

1. An insert for a trim assembly, wherein the trim assembly includes a trim body made of polymer material, and the insert has a U-shaped cross-section and is formed from a metal plate that is embedded in the polymer material, wherein the insert comprises:

a plurality of segments, each of which has said U-shaped cross-section, wherein the segments are spaced apart by a predetermined interval, and the segments include at least a first segment and a second segment, when the first segment is adjacent to the second segment:

first and second coupling members joining the first and second segments together at first and second side wall regions of the first and second segments, respectively wherein said first and second coupling member extend obliquely to the first and second said wall regions, respectively and a of acutely angled corners are formed by junctions between the coupling members and the first segment, and only the acutely angled corners are each defined by a notch formed in the first segment, wherein each notch is substantially defined by a partial cylinder.

2. An insert according to claim 1, wherein the pair of acutely angled corners is a first pair of acutely angled corners and a second pair of acutely angled corners is formed at junctions between the coupling members and the second segment, and each of the acutely angled corners of the second pair is defined by a cylindrical shaped formed in the second segment.

3. An insert according to claim 1, wherein each notch extends inward from an edge of the first segment toward a longitudinal center line of the first segment.

4. An insert according to claim 1, wherein each adjacent pair of said plurality of segments are connected by a pair of said first and second coupling members and a direction in which each coupling member extends, with respect to a side edge of the metal plate, alternates from one coupling member to the next coupling member in the longitudinal direction of the metal plate.

5. An insert according to claim 1, wherein each coupling member has a first end, which is connected to the first segment, and a second end, which is connected to the second segment, and for each coupling member, a distance between the first end and an end edge of a respective one of the side wall regions is different from a distance between the second end and the end edge of the respective one of the side wall regions.

6. An insert according to claim 1, wherein each coupling member has a substantially uniform width.

7. An insert according to claim 1, wherein a surface of each notch is substantially continuous with a side of the corresponding coupling member.

8. An insert according to claim 1, wherein the first and second coupling members are parallel to one another.

9. A trim assembly comprising:
  a trim body made of polymer material;
  an insert formed from a metal plate and embedded in the polymer material, wherein the insert has a U-shaped cross section, and the insert comprises:
    a plurality of segments, each of which has said U-shaped cross-section, wherein the segments are spaced apart by a predetermined interval, and the segments include at least a first segment and a second segment, wherein the first segment is adjacent to the second segment;
  first and second coupling members joining the first and second segments together at first and second side wall regions of the first and second segments respectively, wherein first and second coupling member extend obliquely to the first and second side wall regions respectively, and a pair of acutely angled corners are formed by junctions between the coupling members and the first segment, and only the acutely angled corners are each defined by a notch formed in the first segment, wherein each notch is substantially defined by a partial cylinder.

10. A trim assembly according to claim 9, wherein the pair of acutely angled corners is a first pair of acutely angled corners and a second pair of acutely angled corners is formed at junctions between the coupling members and the second segment, and each of the acutely angled corners of the second pair is defined by a cylindrical shaped notch formed in the second segment, wherein each notch of the second pair of corners is continuous with a side of the corresponding coupling member.

11. A trim assembly according to claim 9, wherein each notch extends inward from an edge of the first segment toward a longitudinal center line of the first segment.

12. A trim assembly according to claim 9, wherein each coupling member has a first end, which is connected to the first segment, and a second end, which is connected to the second segment, and for each coupling member, a distance between the first end and an end edge of a respective one of the side wall regions is different from a distance between the second end and the end edge of the respective one of the side wall regions.

13. A trim assembly according to claim 9, wherein each coupling member has a substantially uniform width.

14. A trim assembly according to claim 9, wherein a surface of each notch is substantially continuous with a side of the corresponding coupling member.

15. A weather strip comprising:
  a trim body made of polymer material;
  a sealing body integrally formed with the trim body; and
  an insert formed from a metal plate and embedded in the polymer material, wherein the insert has a U-shaped cross section, and the insert comprises:
    a plurality of segments, each of which has said U-shaped cross-section, wherein the segments are spaced apart by a predetermined interval, and the segments include at least a first segment and a second segment, wherein the first segment is adjacent to the second segment;
  first and second coupling members joining the first and second segments together at first and second side wall regions of the first and second segments, respectively, wherein first and second coupling members axtend obliquely to the first and second side wall regions, respectively and a pair of acutely angled corners are formed by junctions between the coupling members and the first segment, and only the acutely angled corners are each defined by a notch formed in the first segment, wherein each notch is substantially defined by a partial cylinder.

16. A weather strip according to claims 15, wherein the pair of acutely angled corners is a first pair of acutely angled corners and second pair of acutely angled corners is formed at junctions between the coupling members and the second segment, and each of the acutely angled corners of the second pair is defined by a cylindrical shape notch formed in the second segment, wherein each notch of the second pair of corners is continuous with a side of the corresponding coupling member.

17. A weather strip according to claim 15, wherein each notch extends inward from an edge of the first segment toward a longitudinal center line of the first segment.

18. A weather strip according to claim 15, wherein each coupling member has a first end, which is connected to the first segment, and a second end, which is connected to the second segment, and for each coupling member, a distance between the first end and an end edge of a respective one of the side wall regions is different from a distance between the second end and the end edge of the respective one of the side wall regions.

19. A weather strip according to claim 15, wherein each coupling member has a substantially uniform width.

20. A weather strip according to claim 15, wherein the sealing body is hollow.

* * * * *